US009487641B2

(12) United States Patent
Gutierrez Muniz et al.

(10) Patent No.: US 9,487,641 B2
(45) Date of Patent: Nov. 8, 2016

(54) ADDITIVE TO MODIFY THE RHEOLOGICAL PROPERTIES OF ASPHALT, TO BE USED IN WARM ASPHALT MIXTURES (75) Inventors: Alvaro Gutierrez Muniz, Jalisco (MX); Luis Enrique Ramirez Soto, Jalisco (MX); Heleodro Rincon Acha, Jalisco (MX); Raul Teran Orozco, Jalisco (MX); Raymundo Benitez Lopez, Jalisco (MX); Jose Luis Lara Gonzalez, Jalisco (MX)

(73) Assignee: Quimikao, S.A. DE C.V., Jalisco (MX)

( * ) Notice: Subject to any disclaimer, the term of this patent is extended or adjusted under 35 U.S.C. 154(b) by 333 days.

(21) Appl. No.: 13/882,875

(22) PCT Filed: Nov. 4, 2011

(86) PCT No.: PCT/IB2011/002612
§ 371 (c)(1),
(2), (4) Date: Aug. 13, 2013

(87) PCT Pub. No.: WO2012/059810
PCT Pub. Date: May 10, 2012

(65) Prior Publication Data
US 2014/0020599 A1  Jan. 23, 2014

(30) Foreign Application Priority Data

Nov. 4, 2010  (MX) .................... MX/a/2010/012027

(51) Int. Cl.
*C08K 5/17*  (2006.01)
*C08K 5/00*  (2006.01)
(Continued)

(52) U.S. Cl.
CPC .............. *C08K 5/17* (2013.01); *C08K 5/0008* (2013.01); *C08K 5/315* (2013.01); *C08L 95/00* (2013.01);
(Continued)

(58) Field of Classification Search
CPC ... C08L 95/00; C08L 95/005; C09D 195/00; C10C 3/00; C04B 26/26
See application file for complete search history.

(56) References Cited

U.S. PATENT DOCUMENTS 4,818,367 A * 4/1989 Winkler ......................... 208/23
4,967,008 A * 10/1990 Friedli .................. C07C 209/48
564/511
(Continued)

FOREIGN PATENT DOCUMENTS

EP  2062943 A1 * 5/2009
FR  2834715    7/2003
WO  WO99/58491  11/1999

OTHER PUBLICATIONS

McDonald, Tom "Why Track Tempeature When Paving". Aug. 16, 2011. HMA Manufacture Temp PDF Title http://www.forconstructionpros.com/article/10297263/asphalt-compaction-temperature-and-compaction.*

(Continued)

*Primary Examiner* — Pegah Parvini
*Assistant Examiner* — Alexandra M Moore
(74) *Attorney, Agent, or Firm* — Barnes & Thornburg LLP (57) ABSTRACT An additive that modifies rheological properties of asphalt under warm conditions, and makes it possible to mix and compact asphalt mixtures with a temperature reduction of up to 35° C., constituted by wax, an adhesion-improving additive and a fluxing agent, which reduces asphalt oxidation, causing it to be less-aged and more resistant to fatigue, reduces the interfacial tension between the aggregate and the asphalt, increases adhesion between them, making the mixture resistant to the damages caused by humidity, increases resistance to permanent deformation, causes gas emissions to be reduced and leads to savings in fuel consumption.

The additive of the invention has the following effects: 1) at temperatures between 100° C. and 160° C., it reduces the asphalt viscosity, 2) at temperatures between 58° C. and 82° C., it increases the asphalt viscosity, and 3) at temperatures lower than 25° C., it reduces the asphalt viscosity, as compared to asphalt without the additive.

20 Claims, 5 Drawing Sheets (51) Int. Cl.
  C08K 5/315 (2006.01)
  C08L 95/00 (2006.01)
  C08K 5/01 (2006.01)
  C08L 79/02 (2006.01)
  C08L 91/06 (2006.01)

(52) U.S. Cl.
  CPC .................. *C08K 5/01* (2013.01); *C08L 79/02* (2013.01); *C08L 91/06* (2013.01); *C08L 2555/24* (2013.01); *C08L 2555/52* (2013.01); *C08L 2555/74* (2013.01)

(56) References Cited

U.S. PATENT DOCUMENTS

| | | | |
|---|---|---|---|
| 5,296,633 A * | 3/1994 | Fouquay | C07C 209/48 544/162 |
| 6,013,681 A * | 1/2000 | Asamori et al. | 516/43 |
| 6,027,557 A * | 2/2000 | Hayner | 106/279 |
| 6,048,905 A * | 4/2000 | Asamori | B01F 17/0042 106/277 |
| 6,667,382 B1 * | 12/2003 | Isobe | C07C 211/14 106/246 |
| 6,840,991 B2 * | 1/2005 | Honma | C08L 95/005 106/123.13 |
| 7,608,142 B2 * | 10/2009 | Thorstensson | C07C 211/14 106/277 |
| 2006/0041101 A1 * | 2/2006 | Heinrichs et al. | 528/310 |

OTHER PUBLICATIONS

PCT Search Report and Written Opinion for PCT/IB2011/002612, completed Mar. 8, 2012.

\* cited by examiner

ADDITIVE TO MODIFY THE RHEOLOGICAL PROPERTIES OF ASPHALT, TO BE USED IN WARM ASPHALT MIXTURES

CROSS-REFERENCE TO RELATED APPLICATIONS

This application is a U.S. national counterpart application, filed under 35 U.S.C. §371, of International Application No. PCT/IB2011/002612, filed Nov. 4, 2011, which claims priority to Mexico Patent Application No. MX/a/2010/012027, filed Nov. 4, 2010. The entire disclosures of PCT/IB2011/002612 and Mexico Patent Application No. MX/a/2010/012027 are hereby incorporated by reference.

FIELD OF THE INVENTION

The present invention relates to the area of asphalt mixtures. More specifically, to the additives that are incorporated into asphalt as such prior to mixing with any stone material or compound needed to manufacture and place the asphalt or bituminous mixture as structural paving or surface treatment. And, more specifically, it relates to additives designed to generate warm mixtures by modifying the rheological properties of asphalt.

BACKGROUND OF THE INVENTION

Road paving is based on the application of a layer of asphalt mixture (asphalt surface course) that comprises asphalt, i.e. bituminous products obtained from petroleum and different types of stone materials (aggregates), such as course aggregates, for example, grinded stone material, and fine materials such as sand and dust, or other inorganic fillers. A typical paving asphalt mixture composition may contain about 54% course aggregates, about 35% fine aggregates, about 5% stone dust, and close to 6% asphalt or bitumen, which acts as a binding agent.

Traditional paving methods are called "hot" mix methods. These methods consist of mixing the aggregates with bituminous products at a high temperature, of between 130° C. and 180° C., followed by a placement and compaction process, also under hot conditions.

The so-called Warm Mix Asphalt methods are based on technologies developed in order to reduce the paving temperatures, i.e. the temperatures used in the preparation and application of asphalt surface courses. The basis for these technologies consists of reducing the asphalt viscosity in order to facilitate the mixing thereof with the aggregate, such that compaction of the mixture is effective at temperatures between 20° C. and 55° C. lower than those used in traditional methods. The most obvious advantage arising from reducing the roadway paving temperature is energy savings. Another clear benefit of these techniques is that they facilitate paving in places where heating equipment is not available in situ. In such places, the cooling that may take place during transport of the asphalt would lead to problems when conventional asphalt mixtures are used. On the other hand, Warm Mix techniques allow for a considerable reduction in the emission of toxic smokes, such as carbon monoxide, and nitrous and sulfurous oxides.

Warm Mix techniques basically require having additives that reduce the viscosity of the bituminous compounds. However, such additives will be considered completely effective if they also have an effect on the rest of the technical difficulties that asphalt additives must resolve, in relation to the application and the durability of asphalt. In sum, a suitable additive for the preparation of warm asphalt mixtures should provide a solution for 5 technical problems:

a) asphalt exhibits very high viscosities at temperatures between 100° C. and 160° C., which makes handling difficult at these temperatures.
b) asphalt at temperatures between 58° C. and 82° C. has the consistency of a viscous liquid.
c) asphalt at low temperatures may become too fragile.
d) asphalt reacts with environmental oxygen, which favours the aging thereof.
e) a high interfacial tension is generated between the asphalt and the aggregate, which causes adhesion problems.

In order to resolve the technical problems described above, a large variety of bituminous compositions and application processes have been proposed.

The state of the art includes studies that propose using waxes with a high melting point, which makes it possible to reduce the manufacturing and placement temperature of the mixture by a few degrees. However, using these waxes increases the asphalt viscosity at low temperatures, making the asphalt fragile and brittle. Likewise, patent U.S. Pat. No. 6,588,974 relates to a bitumen or asphalt for the production of an asphalt surface course or asphalt mixture; the bitumen or asphalt contains a proportion of paraffin obtained by means of the Fischer-Tropsch synthesis process (FT paraffin). The invention relates to an asphalt or bituminous mixture and to a method for producing a corresponding road or roadway and/or a filler/coating with asphalt.

The state of the art also includes additives that comprise different types of copolymers. Thus, patent U.S. Pat. No. 4,818,367 relates to a composition for an asphalt mixture that contains a copolymer of olefin with anhydride or nitrile, and an unsaturated elastomer that contains at least two terminal groups, each with an active hydrogen, a halogen, an epoxy oxygen or a cyanocarbon. The composition may be prepared by copolymerizing an olefin with an anhydride or a nitrile in the presence of a free-radical initiator and, subsequently, mixing the copolymer with the asphalt and the elastomer. The copolymer may be initially mixed with a mixture of petroleum oil, then with the elastomer and, finally, with the asphalt. The copolymer may be a polyanhydride of maleic anhydride and 1-octadecane and the elastomer may be a terminal hydroxy-polybutadiene.

The state of the art also includes asphalt compositions that comprise amine-type emulsifiers. Thus, for example, patent JP 163100 discloses suitable liquid emulsifiers to prepare an asphalt emulsion that contain at least one amine compound selected from monoamines and polyamines, with between 8 and 22 carbon atoms in the aliphatic hydrocarbon group and at least one carboxylic acid, which is selected from saturated straight-chain carboxylic acids with an increasing number of carbon atoms; saturated branched-chain carboxylic acids with between 4 and 18 carbon atoms; unsaturated straight-chain carboxylic acids with between 12 and 18 carbon atoms; saturated carboxylic acids each containing a naphthene ring and between 5 and 18 carbon atoms; aromatic carboxylic acids each containing a benzene ring and between 7 and 18 carbon atoms; and dimer acids primarily composed of a dicarboxylic acid with 36 carbon atoms; the proportion by weight between the amine compound and the carboxylic acid ranges between 4/1 and 2/3.

Despite the inventions disclosed in the state of the art, there is still a need to obtain warm asphalt compositions that have mechanical properties similar to those of hot mixtures, and which exhibit a satisfactory behaviour in terms of compaction degree, adhesion and resistance to oxidation and fatigue.

BRIEF SUMMARY OF THE INVENTION

The object of the present invention is an asphalt additive, which is suitable for obtaining a warm asphalt mixture that is resistant to permanent deformation, to cracking caused by fatigue or temperature, to oxidation and to damage caused by humidity,
which comprises a), b), c) and, optionally, d), these being:
a) a wax
b) an adhesion-improving agent
c) a fluxing agent that comprises at least one compound c1, c2 or c3, these being
c1. a straight- or branched-chain alkyl fatty nitrile with between 8 and 22 carbon atoms, saturated or unsaturated;
c2. a dimer nitrile according to formula (I):

Formula (I)

wherein $R_1$ and $R_2$ represent hydrocarbon groups containing between 6 and 12 carbon atoms, preferably 8 carbon atoms, $R_3$ and $R_4$ represent hydrocarbon groups containing between 6 and 12 carbon atoms, preferably 8 carbon atoms;
c3. an aminonitrile, which may be obtained from the reaction of the fatty polyamine with acrylonitrile, according to Formula (II):

Formula (II)

wherein $R_1$ represents a hydrocarbon group, saturated or unsaturated, containing between 8 and 22 carbon atoms, $R_2$, $R_3$ and $R_4$ represent hydrogen atoms or groups represented by the formula: $(CH_2)_nCN$, where n is a number between 1 and 10, A is an ethylene or propylene group, and p is an integer between 1 and 5;
d) a mineral oil Part of the present invention is also a composition that comprises asphalt and an additive according to the invention.

Part of the present invention is also an asphalt mixture that comprises an additive according to the invention.

Part of the present invention is also a method for the preparation of warm asphalt mixtures that comprise an additive according to the invention.

DETAILED DESCRIPTION OF THE INVENTION

The Additive According to the Invention

The additive developed according to the present invention comprises a), b), c) and, optionally, d), these being:
a) a wax
b) an adhesion-improving agent
c) a fluxing agent that comprises at least one compound c1, c2 or c3, these being
c1. a straight- or branched-chain alkyl fatty nitrile with between 8 and 22 carbon atoms, saturated or unsaturated;
c2. a dimer nitrile according to formula (I)

Formula (I)

where $R_1$ and $R_2$ represent hydrocarbon groups containing between 6 and 12 carbon atoms, preferably 8 carbon atoms, $R_3$ and $R_4$ represent hydrocarbon groups containing between 6 and 12 carbon atoms, preferably 8 carbon atoms;
c3. an aminonitrile, which may be obtained from the reaction of the fatty polyamine with acrylonitrile, according to Formula (II):

where $R_1$ represents a hydrocarbon group, saturated or unsaturated, containing between 8 and 22 carbon atoms, $R_2$, $R_3$ and $R_4$ represent hydrogen atoms or groups represented by the formula: $(CH_2)_nCN$, where n is a number between 1 and 10, A is an ethylene or propylene group, and p is an integer between 1 and 5;
d) a mineral oil Component (a)

Component (a) according to the invention comprises a wax.

Preferably, component (a) comprises a synthetic wax, more preferably a polyethylene wax, a Fischer-Tropsch wax, or a saturated fatty amide wax; more preferably, the component comprises a fatty amide wax.

More preferably, component (a) comprises a saturated fatty amide wax that may be obtained from the reaction between fatty acids, preferably fatty acids with a C16 to C18 chain, and a short-chain amine, preferably ethylenediamine.

Component (a) of the additive according to the invention is present in an effective quantity. Preferably, the content of component (a) in the asphalt is between 1% and 20% by weight, more preferably between 1% and 7% by weight with respect to the asphalt component in the asphalt mixture.

Component (b)

Component (b) is an additive for improving adhesion between the stone aggregate and the asphalt.

Preferably, component (b) comprises one or a mixture of two or more aliphatic amines. More preferably, component (b) consists of one or more compounds according to formula (III):

Formula (III):

where

R1 represents a hydrocarbon group, saturated or unsaturated, containing between 8 and 22 carbon atoms, R2 represents a hydrocarbon group, saturated or unsaturated, containing between 8 and 22 carbon atoms, a hydrogen atom, or a group represented by the formula: (R—O)m-H, where R—O represents an alkylene oxide group containing 2 or 3 carbon atoms, preferably 2 carbon atoms, and m is a number between 1 and 30;

$R_3$ and $R_4$ are, independently, a hydrogen atom or a group represented by the formula: (R'O)q-H, where R'O represents an alkylene oxide group containing 2 or 3 carbon atoms, preferably 2 carbon atoms, and q is a number between 1 and 30.

A is an ethylene or propylene group, and p is an integer between 1 and 5.

Component (b) of the additive according to the invention is different from Component (c3). Component (b) of the additive according to the invention is present in the asphalt in an effective quantity. Preferably, the content of component (b) in the asphalt is between 0.05% and 5% by weight, more preferably between 0.1% and 1% by weight with respect to the asphalt component in the asphalt mixture.

Component (c)

Component (c) is a fluxing agent that contains a nitrile group in its chemical structure.

Preferably, component (c) according to the invention comprises at least one of the following compounds (c1), (c2) or (c3), these being:

(c1) a straight- or branched-chain alkyl fatty nitrile with between 8 and 22 carbon atoms, saturated or unsaturated;

(c2) a dimer nitrile according to Formula (I):

Formula (I)

where $R_1$ and $R_2$ represent hydrocarbon groups containing between 6 and 12 carbon atoms, preferably between 8 and 10 carbon atoms, preferably 8 carbon atoms, and where $R_3$ and $R_4$ represent hydrocarbon groups containing between 6 and 12 carbon atoms, preferably between 6 and 8 carbon atoms, preferably 8 carbon atoms.

(c3) An aminonitrile-type compound, which may be obtained from the reaction of the fatty polyamine with acrylonitrile, according to Formula (II):

where $R_1$ represents a hydrocarbon group, saturated or unsaturated, containing between 8 and 22 carbon atoms, $R_2$, $R_3$ and $R_4$ represent hydrogen atoms or groups represented by the formula: $(CH_2)_nCN$, where n is a number between 1 and 10, A is an ethylene or propylene group, and p is an integer between 1 and 5.

Preferably, the content of component (c) according to the invention ranges between 0.5% and 10%, preferably between 1% and 6% by weight with respect to the asphalt component in the asphalt mixture.

Component (d)

Optionally, the additive according to the invention comprises a component (d) that comprises a mineral oil. Preferably, component (d) comprises a mineral oil with a boiling point greater than 160° C. More preferably, the mineral oil according to the invention has a boiling point greater than 160° C. and lower than 200° C.

Component (d) of the additive according to the invention is present in an effective quantity. Preferably, the content of component (d) according to the invention ranges between 0% and 10%, preferably between 0% and 6% by weight with respect to the asphalt component in the asphalt mixture.

The additive according to the invention modifies the thermal susceptibility of asphalt, thereby improving the required viscosity values.

The additive according to the invention has the following effects:

At high temperatures (between 100° C. and 160° C.), it reduces the asphalt viscosity, as compared to asphalt without the additive.

At temperatures between 58° C. and 82° C., it increases the asphalt viscosity, as compared to asphalt without the additive.

At temperatures lower than 25° C., it reduces the asphalt viscosity, as compared to asphalt without the additive.

The benefits of the effects described above have been quantified using Performance Grade (PG) measurements, following the methodology of the AASHTO M-320 method and the AASHTO T-315 specification. Said methodology makes it possible to establish up to what temperature the asphalt will be resistant to permanent deformation by means of the G*/sin δ parameter, which is the result of the ratio between the complex shear modulus (G*) and the sine of the phase angle (δ). An asphalt that is resistant to permanent deformation is characterised by a G*/sin δ value greater than 1.0 kPa. Therefore, an asphalt with a PG of 64 means that 64° C. will be the temperature up to which the asphalt will be resistant to permanent deformation (rutting formation).

Another characteristic that has been evaluated and which demonstrates the benefits of the additive according to the invention is behaviour of the asphalt after being oxidised. The oxidation resistance may be evaluated by means of the AASHTO T-420 test (ASTM D-2872). The results of said test clearly indicate that the additive according to the invention helps to prevent asphalt oxidation, which results in asphalt that is less-aged and more resistant to fatigue. In sum, the additive according to the invention makes it possible to reduce the mixing and compaction temperatures in the manufacturing and placement of asphalt mixtures, thereby reducing gas emissions and saving in fuel consumption. Moreover, the additive according to the invention makes it possible to improve the quality of the asphalt mixture, since it allows for excellent densifications with low percentage of voids, thereby reducing exposure of the asphalt to oxidation. It must be taken into consideration that exposure of asphalt surface courses to air is one of the main hardening and aging mechanisms. Exposure facilitates the loss of the most volatile fractions and oxidation. Oxidation causes hardening, due to the loss of maltenes and the formation of asphaltenes, and the solubilisation of oxidised products in water.

Asphalt Composition According to the Invention

The present invention also relates to an asphalt composition that comprises asphalt (bituminous product) and an additive according to the invention. Also a part of the present invention is an asphalt mixture that comprises asphalt, an additive according to the invention and a stone aggregate.

The asphalt compositions that comprise an additive according to the invention are characterised by i) and ii):

i) An improvement in the temperature-dependent viscosity gradient
  At high temperatures (approximately about 90° C. to 160° C.), it causes a reduction in viscosity.
  At medium temperature (approximately about 55° C. to 85° C.), it causes an increase in viscosity and a reduction in the phase angle δ (increased elasticity).
  At low temperatures (approximately lower than about 25° C.), it causes a reduction in viscosity.
ii) Improved protection against oxidation.

The effects described in regards to the evolution of viscosity with temperature, as well as in regards to protection against oxidation have significant benefits. On the one hand, they improve ease of handling in the mixture manufacturing and placement stage, and it is possible to mix and compact the asphalt mixtures with a reduction in temperature of up to 35° C. as compared to traditional hot asphalt mixtures. The advantage of reducing the asphalt viscosity at high temperatures generates warm asphalt mixtures, which provide numerous benefits in terms of paving, the environment and working conditions. On the other hand, they increase resistance to permanent deformation, since the asphalt viscosity increases at temperatures between about 55° C. and 85° C. Furthermore, the present invention reduces the asphalt viscosity at temperatures lower than 25° C., leading to asphalt that is softer (less fragile) and more resistant to cracking caused by fatigue; and, additionally, the present invention reduces asphalt oxidation.

The present invention also relates to a method for preparing asphalt mixtures that comprise an additive according to the invention. The method according to the invention comprises preparation of the additive according to the invention prior to the addition thereof on the asphalt mixture. Preparation of the additive according to the invention comprises heating component (a), the wax, at a temperature at least 10° C. higher than the melting point of said component, preferably at a temperature between 140° C. and 150° C.; subsequently, component (b) is added to the already melted wax and they are mixed until they are completely homogenised; and, finally, component (c) is added. Once the additive is prepared, it is added onto the asphalt (or asphalt mixture), which is at a temperature greater than 140° C.

EXAMPLES

The present invention will be illustrated in more detail with the following examples; however, said examples should not be considered to limit the scope of the present invention.

Table 1 presents the compositions of the additives according to the invention, 6 to 8, and comparative examples 1 to 5. Example 1 corresponds to unmodified AC-20 asphalt from Salamanca (without any additives). Example 2 uses AC-20 asphalt from Cadareyta that contains, as the additive, 1.5% by weight of SBS-type polymer (styrene-butadiene-styrene), whereas in the rest of cases conventional AC-20 asphalt from the Salamanca refinery was used. The asphalt was heated to a temperature of 140° C.-150° C.; at this temperature, the previously prepared additive was incorporated thereto, the asphalt was allowed to cool and, subsequently, the functionality tests shown in the following sections were performed.

TABLE 1

Composition of the additive and the Warm Asphalt Mixture. The composition values refer to the percentage by weight calculated on the basis of the total asphalt mixture.

| | | COMPONENT | Example 1 | Example 2 | Example 3 | Example 4 | Example 5 | Example 7 | Example 8 |
|---|---|---|---|---|---|---|---|---|---|
| ADDITIVE | A | Fischer-Tropsch Wax | | | 0.25 (4.0) | | | | |
| | | Polyethylene Wax | | | | 0.25 (4.0) | | | |
| | | Saturated amide wax, C16, C18 | | | | | 0.25 (4.0) | 0.183 (3.0) | 0.234 (4.0) |
| | B | Aliphatic amine (tallow branched tetramine) | | | | | | 0.018 (0.3) | 0.018 (0.3) |
| | C | Dimer Nitrile | | | | | | 0.183 (3.0) | |
| | | Mineral Oil | | | | | | | |
| | | Amino nitrile | | | | | | | 0.393 (6.7) |
| | | Total dose of additive | 0.0 | 0.0 | 0.25 | 0.25 | 0.25 | 0.385 (6.3) | 0.645 (11.0) |

TABLE 1-continued

Composition of the additive and the Warm Asphalt Mixture. The composition values refer to the percentage by weight calculated on the basis of the total asphalt mixture.

| COMPONENT | | Example |
| --- | --- | --- |
| | | 1 | 2 | 3 | 4 | 5 | 7 | 8 |
| ASPHALT | AC-20 from Salamanca - Penetration 60-65 | 6.5 | | 6.25 | 6.25 | 6.25 | 6.12 | 5.86 |
| | AC-20 from Cadereyta with 1.5% SBS | | 6.5 | | | | | |
| SILICEOUS AGGREGATE | | 93.5 | 93.5 | 93.5 | 93.5 | 93.5 | 93.5 | 93.5 |

( ) % with respect to the asphalt

1. Asphalt Viscosity at Temperatures Between 120° C. and 150° C.

The Asphalt Institute and the SUPERPAVE methodology recommend an asphalt viscosity of 0.170+/−0.20 Pa·s in order to obtain excellent mixing in the manufacturing of hot asphalt mixtures and, for compaction, they recommend an asphalt viscosity of 0.280+/−0.30 Pa·s in order to obtain excellent densification with a low percentage of voids. The results shown in FIG. 1 indicate that the additive according to the invention reduces the asphalt viscosity at temperatures between 120° C. and 150° C., thereby facilitating the mixing, compaction and placement of asphalt mixtures.

Example 1 of Table 1, which is AC-20 asphalt from Salamanca without any additive has a viscosity of 0.280 Pa·s at a temperature of 147° C.; therefore, this will be the compaction temperature for the asphalt mixture. In Example 8 of Table 1, which is AC-20 asphalt from Salamanca plus the additive according to the invention, the asphalt has a viscosity of 0.280 Pa·s at a temperature of 126° C., which means that the mixture will be compacted at this temperature. Upon comparing the compaction temperatures in Example 1 and Example 8 of Table 1, we observe that there is a difference of 21° C., which represents a great energy saving, since the asphalt is not heated; thus, a lower quantity of fuel is needed, and this contributes to reducing carbon dioxide emissions.

Figure 1:
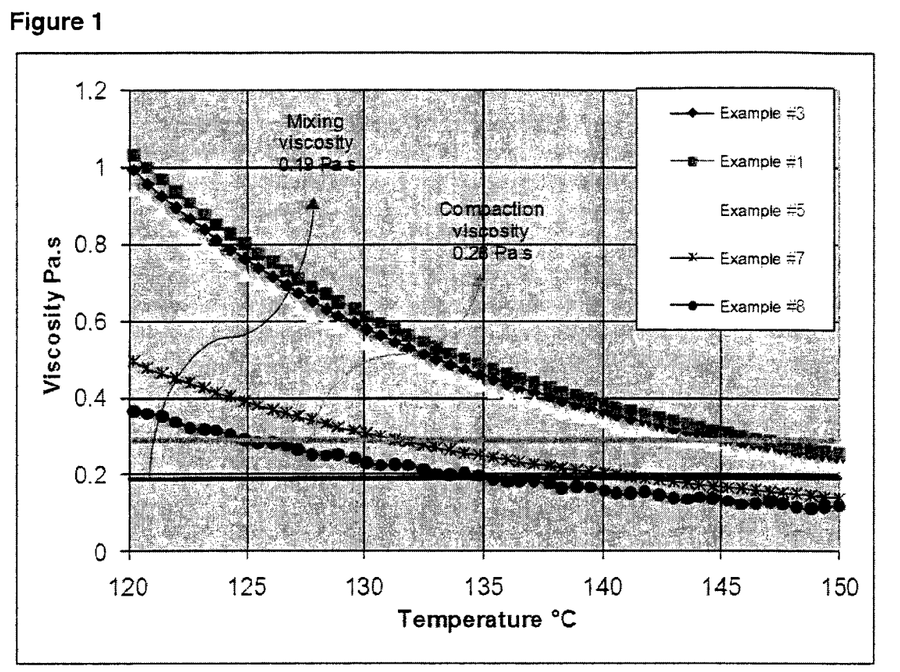
FIG. 1 shows that an additive according to the invention (Examples 7 and 8) reduces asphalt viscosity to a greater extent than wax (Examples 3, 4 and 5) at temperatures between 120° C. and 150° C., thereby facilitating the mixing, compaction and placement of asphalt mixtures.

FIG. 1 also shows that Examples 3, 4 and 5, which only contain wax, do not reduce the asphalt viscosity at these temperatures as much as Examples 7 and 8, which contain the additive according to the invention.

The compaction temperatures for the different asphalt compositions are shown in Table 2.

TABLE 2

| | Example 1 | Example 3 | Example 5 | Example 7 | Example 8 |
| --- | --- | --- | --- | --- | --- |
| Mixing temperature in ° C. (viscosity = 0.19 Pa · s) | 160 | 153 | 152 | 142 | 135 |
| Compaction temperature in ° C. (viscosity = 0.28 Pa · s) | 148 | 141 | 140 | 128 | 126 |

The viscosity measurements in this first section of Examples and in all the following are performed using the constant shear stress dynamic shear rheometer (DSR) using the AASHTO M320 method, by calculating the complex shear modulus in Pascals in order to subsequently divide it by the operating frequency of 10 radians per second, in order to obtain the viscosity values in Pascals per second.

2. Asphalt Behaviour Assays at Temperatures Between 58° C. and 82° C.

The additive according to the invention increases the asphalt viscosity at temperatures between 58° C. and 82° C., thereby preventing the problem of permanent deformation or rutting (see Table 3).

Example 1 in Table 3 shows that, at temperatures between 58° C. and 82° C., the asphalt without any additive has low viscosity values; it behaves like a viscous liquid. Example 8 has a greater viscosity, especially at 82° C., leading to asphalt that is more resistant to permanent deformation; the viscosity is even greater than that of Example 2, which contains SBS polymer, the additive used to increase viscosity at these temperatures.

TABLE 3

| Temperature ° C. | Example 1 | Example 2 | Example 8 |
| --- | --- | --- | --- |
| | | Viscosity Pa · s | |
| 58 | 292 | 515.3 | 411.2 |
| 64 | 130.6 | 254.8 | 234.1 |
| 70 | 62.09 | 132.0 | 165.9 |
| 76 | 31.99 | 70.78 | 115.7 |
| 82 | 15.25 | 35.10 | 87.50 |

Another test that demonstrates that the additive according to the invention prevents the problem of permanent deformation is measurement of the magnitude of the elastic component of the asphalt at temperatures between 58° C. and 82° C. In the absence of additive, it tends to be very low, since the asphalt ceases to exhibit viscoelastic behaviour, and behaves like a viscous liquid, which causes the asphalt to not recover upon receiving a load. The results of Example 8 correspond to an elastic component with a higher value, especially at 82° C., leading to asphalt that is more resistant to permanent deformation; this elastic component has an even higher value than Example 2, which contains SBS polymer, the additive used to increase this elastic component.

TABLE 4

| Temperature ° C. | Example 1 | Example 2 | Example 8 |
| --- | --- | --- | --- |
| | Elastic Component G' (Pa · s) | | |
| 52 | 888.1 | 3591 | 2992 |
| 58 | 278.6 | 1589 | 1988 |
| 64 | 85.77 | 704.9 | 1079 |
| 70 | 26.12 | 314.3 | 840.2 |
| 76 | 7.991 | 140.1 | 628.6 |
| 82 | 3.521 | 60.2 | 489.5 |

Another test that shows that the additive prevents the problem of permanent deformation is measurement of the phase angle, which, as it approaches 90 degrees, indicates that the asphalt fully behaves like a viscous liquid.

Figure 2:
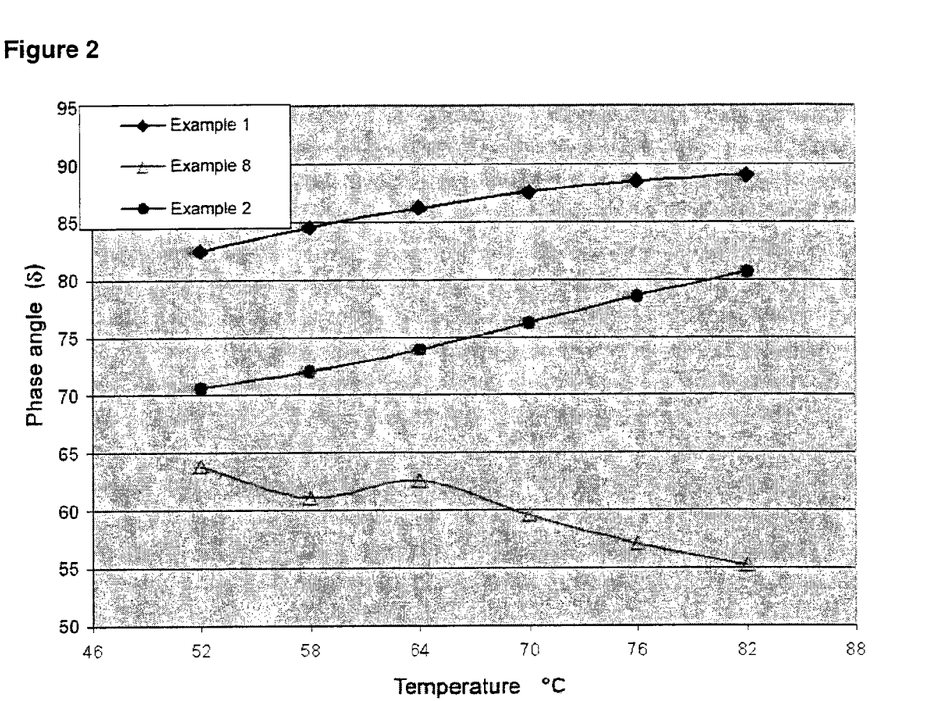
FIG. 2 shows that asphalt containing an additive according to the invention (Example 8) presents lower phase angle values than comparative examples (Examples 1 and 2) at temperatures between 58° C. and 82° C.

FIG. 2 shows that the asphalt that contains the additive according to the invention (Example 8) presents lower phase angle values at temperatures between 58° C. and 82° C., with respect to the comparative examples (1 and 2).

3. Asphalt Assays at Temperatures Between 7° C. and 31° C.

Addition of the additive according to the invention (Example 8) reduces the asphalt viscosity at temperatures between 7° C. and 31° C., as compared to the viscosity obtained for asphalt in the absence of additives (Example 1) and also as compared to Example 5, which only contains wax, where the viscosity is much higher; this demonstrates the disadvantage of using waxes.

Figure 3:
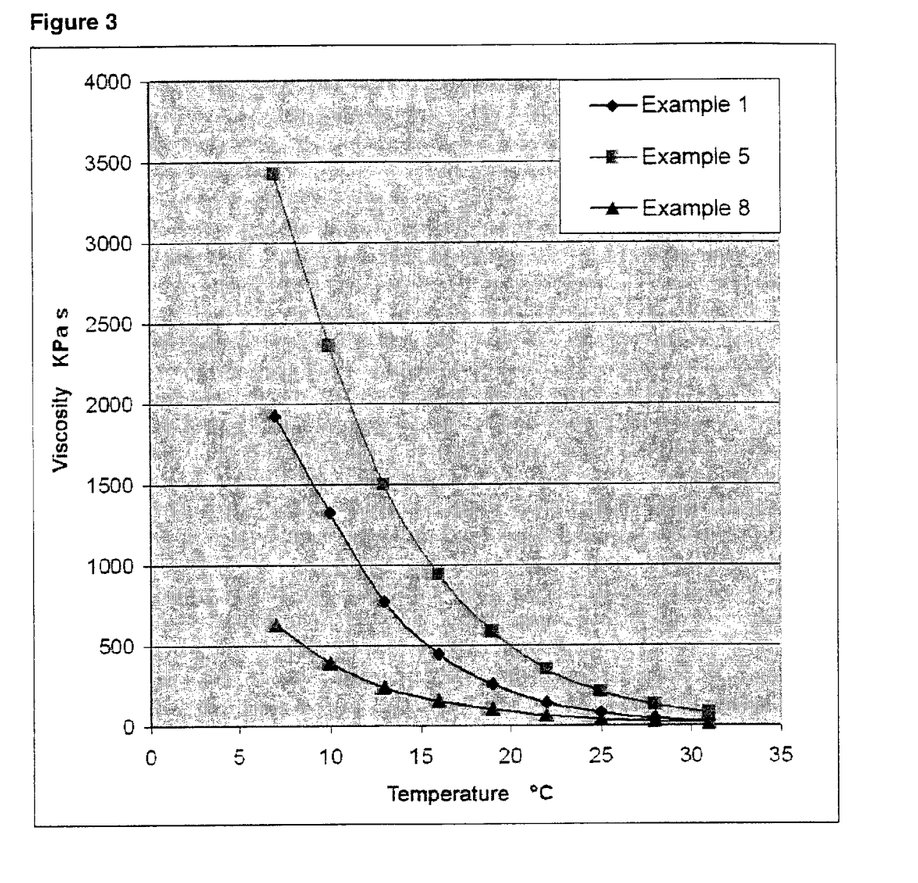
FIG. 3 shows that addition of an additive according to the invention (Example 8) reduces asphalt viscosity at temperatures between 7° C. and 31° C., which means greater resistance to cracking caused by fatigue.

FIG. 3 shows that addition of the additive according to the invention reduces the asphalt viscosity at temperatures between 7° C. and 31° C. (Example 8), which means greater resistance to cracking caused by fatigue.

4. Viscosity Assays in the Entire Temperature Range

Figure 4:
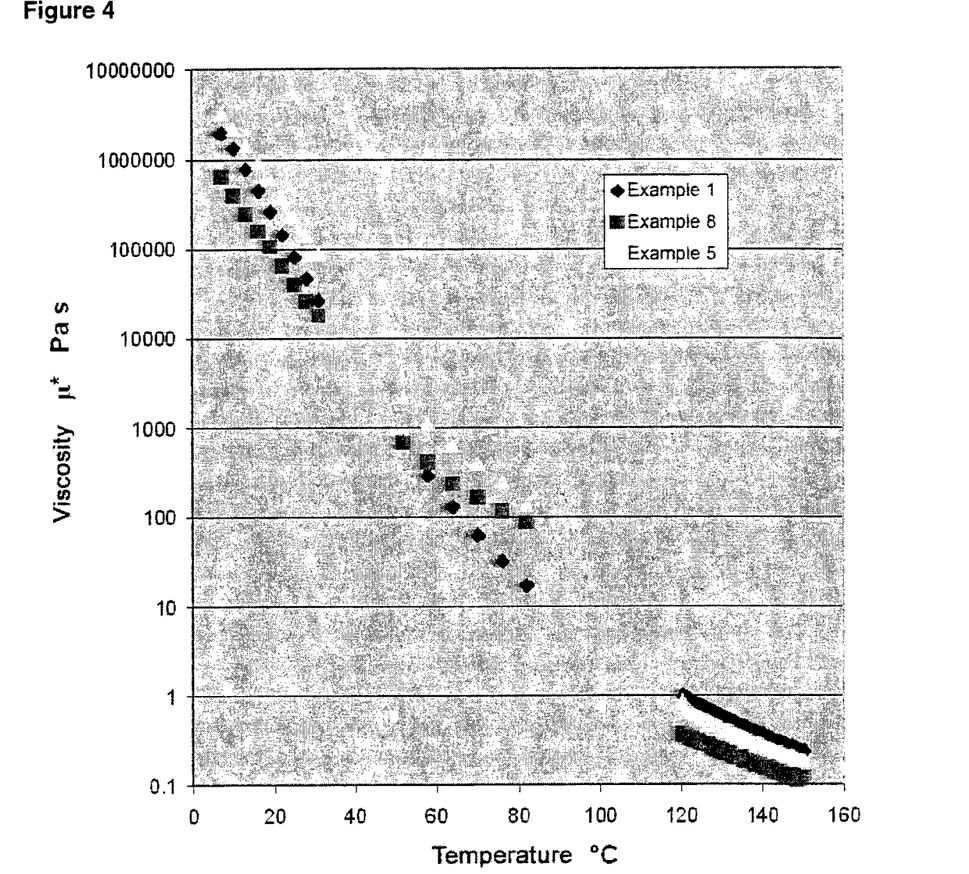
FIG. 4 shows that addition of an additive according to the invention (Example 8) modifies asphalt viscosity in the temperature range between 7° C. and 150° C., thereby improving asphalt behaviour over the entire range.

FIG. 4 shows that the additive according to the invention (Example 8) modifies the asphalt viscosity in the range of temperatures between 7° C. and 150° C., thereby improving asphalt behaviour throughout the entire range.

FIG. 4 shows that, without any additives (Example 1), the viscosity exhibits a linear behaviour with temperature; at temperatures between 120° C. and 150° C., it presents high viscosities (which hinders the mixing and compaction of the asphalt mixtures); at temperatures between 58° C. and 82° C., it shows low viscosity values (the asphalt is easily deformed); at low temperatures, the asphalt viscosity increases (it tends to crack). The asphalt that contains the additive according to the invention (Example 8) has a lower viscosity between 120° C. and 150° C. as compared to the absence of additive (this facilitates the mixing and compaction of the asphalt mixtures); a greater viscosity between 58° C. and 82° C. as compared to the absence of additive (the asphalt is less easily deformed); a lower viscosity between 7° C. and 31° C. as compared to the absence of additive (reduced tendency to cracking).

Example 5, which contains only ceramide, improves the viscosity values in the range of temperatures between 120° C. and 150° C. and in the range between 58° C. to 82° C., but, at temperatures between 7° C. and 31° C., the viscosity increases as compared to the absence of additive, which means a worsening of cracking problems.

5. Protection Against Oxidation Assays

Figure 5:
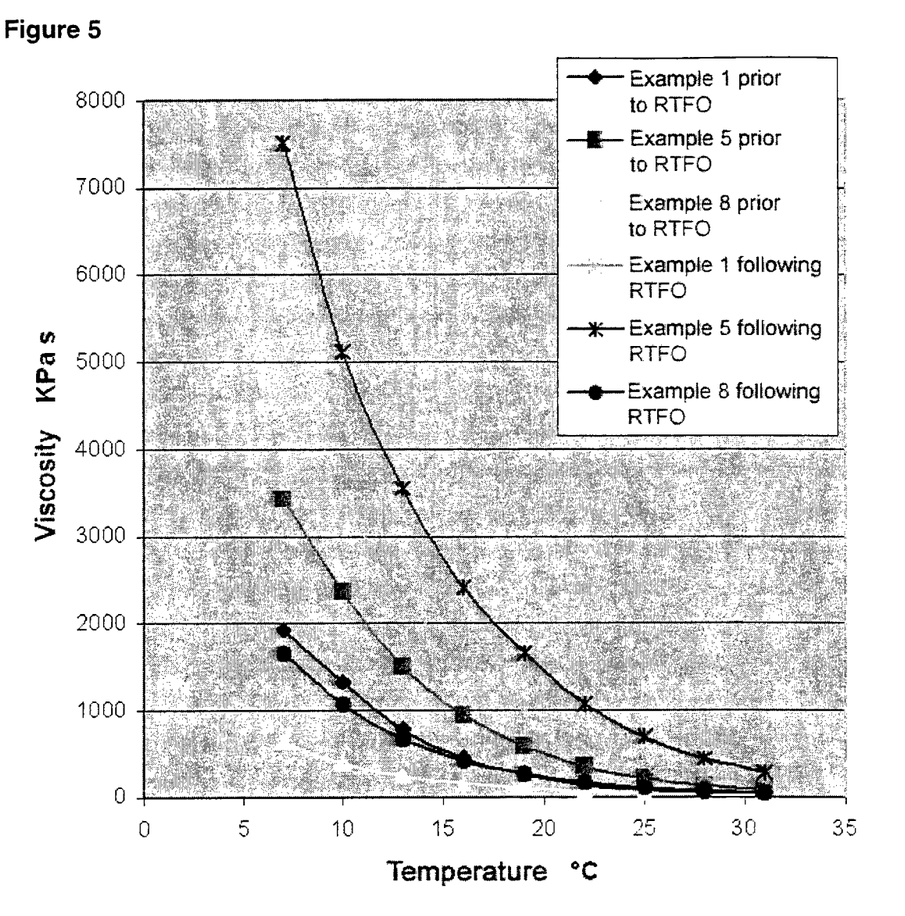
FIG. 5 shows that addition of an additive according to the invention (Example 8) makes it possible to maintain asphalt viscosity at low values at temperatures between 7° C. and 31° C., even after the Rolling Thin Film oxidation (RTFO) test (AASHTO T240, ASTM D2872).

FIG. 5 shows that addition of the additive according to the invention makes it possible to maintain the asphalt viscosity at low values at temperatures between 7° C. and 31° C., even after the oxidation test (Rolling Thin Film Oven test (RTFO), AASHTO T240, ASTM D2872). The reduction in the viscosity of the oxidised asphalt that contains the additive, as compared to the oxidised asphalt in the comparative examples, indicates that the additive according to the invention increases resistance to oxidation, and, therefore, resistance to cracking caused by fatigue.

6. Compaction Test

An asphalt mixture was prepared, manufactured with the asphalt modified with the additive according to the invention and mixed with the aggregate. The mixing was performed at a temperature of 136° C. and compacted at different temperatures: 115° C., 125° C. and 135° C., exhibiting a higher density (2.414, 2.402 and 2.394 kg/m³, respectively) than the mixture manufactured with the original asphalt compacted at 145° C., which had a density of 2.380 kg/m³. Therefore, we can reduce the compaction temperatures, to obtain a Warm Mix.

7. Adhesion Test

The ASTM D-3625 test evaluates the damage caused by water in asphalt mixtures. The ASTM D-3625 test was performed with two asphalt mixtures prepared according to the methodology described in the previous section (boiling point). The result obtained indicates that the asphalt mixture prepared according to the composition indicated in Example 1 of Table 1 had a coating percentage of 40%. The asphalt mixture prepared with the additive according to the composition indicated as Example 8 in Table 1, according to the invention, had a coating percentage of 100%. Therefore, the additive developed increases the adhesion between them, making the asphalt mixture more resistant to damages caused by humidity.

The invention claimed is:

1. An asphalt additive, comprising:
   (a) a wax;
   (b) an adhesion-improving agent;
   (c) a fluxing agent that comprises at least one compound selected from c2 or c3, wherein c2 is a dimer nitrile according to Formula (I):

Formula (I)

wherein $R_1$, $R_2$, $R_3$, and $R_4$ represent hydrocarbon groups containing between 6 to 12 carbon atoms; and c3 is an aminonitrile according to Formula (II):

Formula (II)

that may be obtained from the reaction of a fatty polyamine with acrylonitrile,
wherein $R_1$ represents a hydrocarbon group, saturated or unsaturated, containing between 8 to 22 carbon and at least one of $R_2$, $R_3$, and $R_4$ is represented by the formula: $(CH_2)_nCN$, and wherein n is a number between 1 and 10, A is an ethylene or propylene group, and p is an integer between 1 and 5.

2. The additive according to claim 1, wherein $R_1$, $R_2$, $R_3$, and $R_4$ in Formula (I) represent hydrocarbon groups containing 8 carbon atoms.

3. The additive according to claim 1, wherein component (a) comprises a synthetic wax, a polyethylene wax, a Fischer-Tropsch wax, or a saturated fatty amide wax.

4. The additive according to claim 1, wherein component (a) comprises a saturated fatty amide wax.

5. The additive according to claim 1, wherein component a) is obtained from a reaction between fatty acids with a C16 to C18 chain and a short-chain amine.

6. The additive according to claim 5, wherein the short-chain amine is ethylenediamine.

7. The additive according to claim 1, wherein component (a) is present at between 1% and 20% by weight with respect to the asphalt in an asphalt mixture.

8. The additive according to claim 1, wherein component (b) comprises one or a mixture of two or more aliphatic amines.

9. The additive according to claim 1, wherein component (b) comprises one or more compounds according to Formula (III):

Formula (III)

wherein

R$_1$ represents a hydrocarbon group, saturated or unsaturated, containing between 8 and 22 carbon atoms;

R$_2$ represents a hydrocarbon group, saturated or unsaturated, containing between 8 and 22 carbon atoms, a hydrogen atom, or a group represented by the formula: (R—O)m-H, where R—O represents an alkylene oxide group containing 2 or 3 carbon atoms, and m is a number between 1 and 30;

R$_3$ and R$_4$ are, independently, a hydrogen atom or a group represented by the formula: (R'O)q-H, where R'O represents an alkylene oxide group containing 2 or 3 carbon atoms, and q is a number between 1 and 30;

A is an ethylene or propylene group, and p is an integer between 1 and 5.

10. The additive according to claim 9, wherein the alkylene oxide group contains 2 carbon atoms.

11. The additive according to claim 1, wherein component (b) is present at between 0.05% and 5% by weight with respect to the asphalt in an asphalt mixture.

12. The additive according to claim 1, wherein component (c) is present at between 0.5% and 10% by weight with respect to the asphalt in an asphalt mixture.

13. The additive according to claim 1, further comprising (d) a mineral oil.

14. The additive according to claim 13, wherein the mineral oil comprises a mineral oil which has a boiling point greater than 160° C.

15. The additive according to claim 13, wherein the mineral oil is present at between 0.5% and 10% by weight with respect to the asphalt in an asphalt mixture.

16. An asphalt composition, comprising asphalt and an additive according to claim 1.

17. A method for preparing asphalt mixtures, comprising preparation of the additive according to claim 1 by means of a process that comprises heating component (a) at a temperature at least 10° C. higher than the melting point of said component, addition of component (b) to melted component (a), mixing component (a) and component (b) until completely homogenised, and subsequent addition of component (c).

18. A method for preparing asphalt mixtures, comprising preparation of the additive according to claim 2 by means of a process that comprises heating component (a) at a temperature at least 10° C. higher than the melting point of said component, addition of component (b) to melted component (a), mixing component (a) and component (b) until completely homogenised, and subsequent addition of component (c).

19. A method for preparing asphalt mixtures, comprising preparation of the additive according to claim 6 by means of a process that comprises heating component (a) at a temperature at least 10° C. higher than the melting point of said component, addition of component (b) to melted component (a), mixing component (a) and component (b) until completely homogenised, and subsequent addition of component (c).

20. A method for preparing asphalt mixtures, comprising preparation of the additive according to claim 10 by means of a process that comprises heating component (a) at a temperature at least 10° C. higher than the melting point of said component, addition of component (b) to melted component (a), mixing component (a) and component (b) until completely homogenised, and subsequent addition of component (c).

* * * * *

UNITED STATES PATENT AND TRADEMARK OFFICE
CERTIFICATE OF CORRECTION

| | | |
|---|---|---|
| PATENT NO. | : 9,487,641 B2 | Page 1 of 1 |
| APPLICATION NO. | : 13/882875 | |
| DATED | : November 8, 2016 | |
| INVENTOR(S) | : Muniz et al. | |

It is certified that error appears in the above-identified patent and that said Letters Patent is hereby corrected as shown below:

In the Claims:

In Claim 1, Column 12, Line 41, the phrase "8 to 22 carbon" should read -- 8 to 22 carbon atoms --.

Signed and Sealed this
Twenty-seventh Day of December, 2016

Michelle K. Lee
*Director of the United States Patent and Trademark Office*